(12) United States Patent
Baker

(10) Patent No.: US 7,610,161 B2
(45) Date of Patent: Oct. 27, 2009

(54) WANDER GAMUT DISPLAY

(75) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1335 days.

(21) Appl. No.: 10/428,361

(22) Filed: May 1, 2003

(65) Prior Publication Data

US 2004/0233291 A1  Nov. 25, 2004

(51) Int. Cl.
*G01R 13/00* (2006.01)

(52) U.S. Cl. .......................... 702/69; 375/371; 702/72; 702/75

(58) Field of Classification Search .................. 702/67, 702/69, 72, 75, 84, 108, 121; 375/228, 371, 375/372; 345/99, 629; 348/186, 194; 725/114
See application file for complete search history.

(56) References Cited

U.S. PATENT DOCUMENTS

| 4,800,571 | A  | * | 1/1989  | Konishi | ....................... | 375/228 |
| 6,650,719 | B1 | * | 11/2003 | Baker   | ......................... | 375/371 |

FOREIGN PATENT DOCUMENTS

| JP | 06-243369   | 9/1994  |
| JP | 06-303648   | 10/1994 |
| JP | 08-136595   | 5/1996  |
| JP | 2000-350154 | 12/2000 |
| JP | 2002-118862 | 4/2002  |

OTHER PUBLICATIONS

Tektronix, Inc., "VM700T (turbo) option 1S/2S serial digital video measurement set", 1999.*

William Pacino, "Principles & Metrics of Jitter and Wander", Mar. 1997 Tutorial/Technical Article, Hong Kong engineering magazine and user manual and Windows Help file.

* cited by examiner

*Primary Examiner*—John H Le
(74) *Attorney, Agent, or Firm*—Francis I. Gray; Michael A. Nelson

(57) ABSTRACT

A wander gamut display for perturbation analysis is created by determining from a periodic input data signal and a reference clock a frequency offset and frequency drift rate for the input signal. The frequency offset and frequency drift rate are input to respective orthogonal axes of a Cartesian display together with a wander limit bounding box that defines the wander gamut. Values that fall outside the bounding box on the display indicate wander that may result in data errors.

6 Claims, 3 Drawing Sheets

Freq offset limits: FOup := 10   FOlow := −10   ppm
Drift-rate limits: DRup := .05   DRlow := −.05   ppm/s Demarcation Freq:  bw = 0.1   Hz

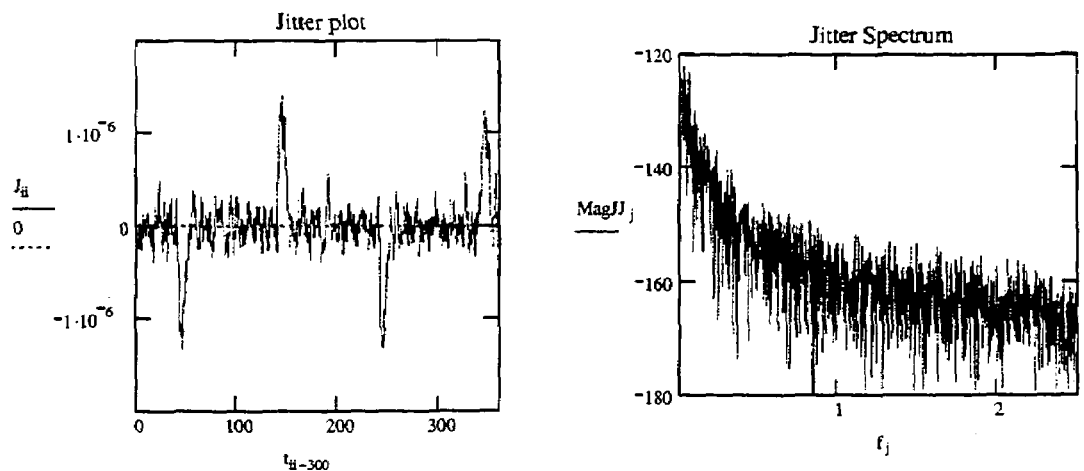
Fig. 4.                                    Fig. 5.
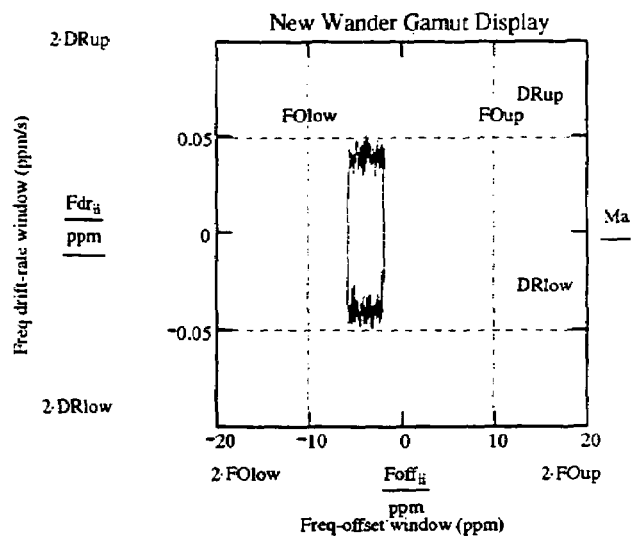
Fig. 6.

WANDER GAMUT DISPLAY

BACKGROUND OF THE INVENTION

The present invention relates to video measurements, and more particularly to a wander gamut display for indicating low frequency jitter in a video distribution system.

The measurement of low frequency jitter or wander is more important today in data transmission than it has ever been. The telephone companies have long recognized the importance of long term stability and low frequency timing perturbations of the "significant instants" for error free data transfer over SONET and SDH networks. A wander measurement addresses the low frequency or long period timing errors, often termed wander or very low-frequency jitter. In SONET and SDH systems the accuracy and stability of clocks is very important for proper data recovery. To provide a concise measure of synchronization quality, several wander parameters have been defined by the ETSI (ETSI EN 300 462 "Transmission and Multiplexing™; Generic Requirements for Synchronization Networks". Part 1-1: "Definitions and Terminology for Synchronization Networks") and ITU-T (ITU_T Rec G.810 "Definitions and Terminology for Synchronization Networks") for SONET/SDH TelCom transmission and are used to specify performance limits. Some examples are Time Interval Error (wander in ns—TIE), Maximum Time Interval Error (related to a variable window of TIE—MTIE), and Time DEViation (TDEV). TIE is defined as the time-error of the significant instances between a signal being measured and a (wander-free) reference clock. MTIE is a measure of wander that characterizes wander as a function of duration or variable windowed segment of the TIE. TDEV is a statistical measure derived from the well-known Modified Allan Variance for characterizing frequency standards. MTIE and TDEV are often specified in terms of masks outlining the maximum limits allowed. Unfortunately wander is a problem that is not limited to SONET and SDH systems, but is also important in clock recovery and jitter measurements of data transmission in general. There are many instruments that measure the timing metrics associated with jitter, but it is often not clear how practical jitter measurements should process the wander component and how the timing metrics can be quantified as something more meaningful and practical for wander as it relates to subsequent clock recovery, particularly with regard to video data transmission.

Today's video distribution has many variable rate processing elements, such as MPEG processing, but must eventually be isochronal for quality image and audio presentation. In isochronous and synchronous systems the low frequency jitter and wander components may be very large in terms of phase-error or time-error (typically measured in seconds) without causing data loss since the clock is recovered with a phase locked loop (PLL) and the phase variations are tracked. Loss of data only occurs when the higher order time derivatives of the phase (frequency offset and frequency drift rate) exceed the tracking limits or specifications of the clock timing recovery or PLL. For example the average frequency offset has to be within the lock range of the PLL for lock to occur so this is an important performance limit to be measured. Even if the frequency offset is within limits, the frequency drift rate or slew has to be limited since virtually all clock recovery systems (PLLs) track with a static phase error that increases with frequency slew rate. If this static phase error is too much, intermittent data errors occur. In addition, jitter measurement systems may be affected by a wander component causing mysterious discrepancies in jitter measurements among different manufacturers of the jitter measurement equipment. Unfortunately there are few measurement standards and virtually no equipment to detect and quantify the wander and properly reject wander from jitter measurements. The methods of MTIE and TDEV are not well suited for video specifications that prefer to specify video wander in terms of frequency offset and frequency drift rate, and have not been adopted by the video industry.

Even in the midst of modern digital signal processing methods, video is often eventually converted to a composite analog form, such as the NTSC or PAL standard, where a subcarrier is used for the color information to achieve compatibility with monochrome televisions. NTSC and PAL standards specify a maximum frequency error and frequency drift rate for the color subcarrier and, since virtually all composite signals today are derived from a single recovered clock, this maximum frequency error and frequency drift rate is then imposed on the recovered system clock of any digital transmission of video data. Therefore it is important to quantify timing wander in terms of both frequency offset and frequency drift rate on serial digital video data interfaces as well as baseband analog video distribution.

Tektronix, Inc., an Oregon corporation, has provided needed wander measurements on baseband video with the VM700 Video Measurement Set, on serial-digital video with the VM700-1S Video Measurement Set and on MPEG video with the MTS-300 MPEG Test Set and the MTM-400 MPEG Transport Stream Monitor. These products measure and quantify both jitter and wander as separate timing errors and properly separate the wander components from the jitter measurement and vice versa. Unfortunately for the wander measurement these products produce sliding window time graphs lasting only thirty seconds or less. These are hard to use since long periods—minutes or hours—are required to verify compliance and the window period is typically not long enough to graph the long period wander, requiring the operator to watch the trace rise and fall in the sliding window to assess the nature and extent of the wander. By using alarm triggered time stamps it is possible to log wander limit violations, but the nature or wave shape of the wander is not captured with so short a time window.

What is needed is a simple to interpret display for compliance validation that is orthogonal to time such that a memory of all wander variations is retained in order to assess limit violations and graphically represent the nature or signature of the wander.

BRIEF SUMMARY OF THE INVENTION

Accordingly the present invention provides a wander gamut display by determining from a periodic input signal and a reference clock a frequency offset and frequency drift rate for the input signal. The frequency offset and frequency drift rate are then input to different axes of a Cartesian display together with a wander limit bounding box that defines the wander gamut. So long as the displayed values are within the bounding box, wander is within limits. However if the displayed values are outside the bounding box, then a wander problem with the input signal is indicated that could result in data errors.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 4 is a graphical view of a jitter plot.

FIG. 5 is a graphical view of a jitter spectrum plot.

FIG. 6 is a graphical view of a wander gamut display plot according to the present invention.

DETAILED DESCRIPTION OF THE INVENTION

Figure 1:
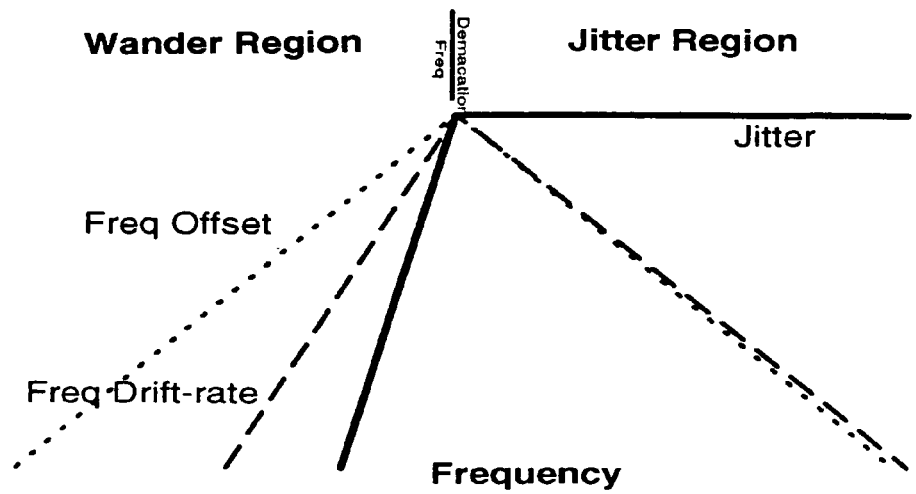
FIG. 1 is a graphical view of a response plot illustrating jitter and wander.
Figure 2:
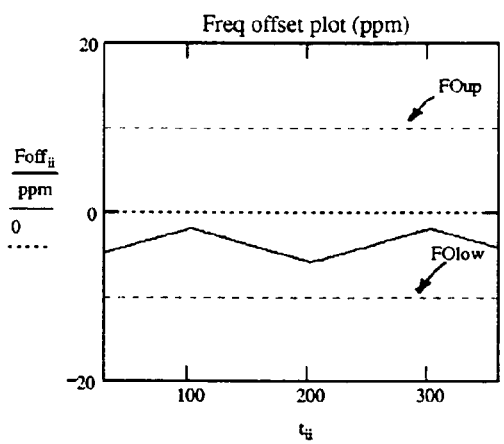
FIG. 2 is a graphical view of a frequency offset plot.

Referring now to the response plot of FIG. 1 jitter is preferably measured with a high pass function of at least third order to reject wander from the measurement. A cut-off frequency is referred to as a demarcation frequency between jitter and wander. Wander is measured with the responses shown as two metrics—frequency offset and frequency drift rate. Frequency offset is the time derivative (6 dB/octave slope) below the demarcation frequency and is low pass filtered above the demarcation frequency. Frequency drift rate is similarly processed with a low pass filter, but is the second derivative (12 dB/octave slope) below the demarcation frequency. These two wander components and the jitter are currently shown as time graphs, as shown in FIGS. 2-5, and individually tested for violation of preset limits. In FIGS. 2-5 the signal under test has a triangular wander frequency offset component as shown in FIG. 2.

Figure 3:
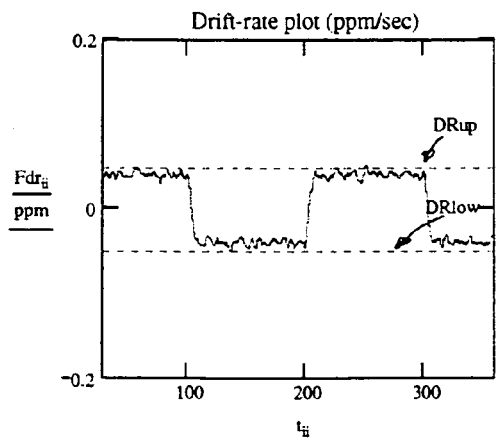
FIG. 3 is a graphical view of a drift rate plot.

FIG. 6 illustrates a wander gamut display according to the present invention as an XY plot of the frequency drift rate of FIG. 3 on one axis, such as the vertical axis, and the frequency offset of FIG. 2 on the other axis, such as the horizontal axis, to create a Cartesian plot of the two wander parameters. This display may be used in conjunction with the jitter plots, FIGS. 4-5, to augment the displays and provide a seamless analysis of jitter/wander over all spectral components.

Valid wander is contained within a central bounding box. Any excursion outside the bounding box means the acceptable wander performance limit, either drift rate or drift limit, has been exceeded. Violation of these limits may be indicated by color change or highlighting and logged with a time stamp. The wander components are filtered to the wander demarcation frequency before plotting.

To provide a wander gamut display over time, the values for the wander gamut display may be recursively updated with a set integration time. Also the values may be accumulated until cleared to provide infinite persistence for program quality control testing.

The wander gamut display measures the timing perturbations below the selected demarcation frequency and the jitter waveform plots the jitter versus time and/or jitter versus frequency above the demarcation frequency to provide a seamless timing perturbation analysis of all spectral components.

Figure 7:
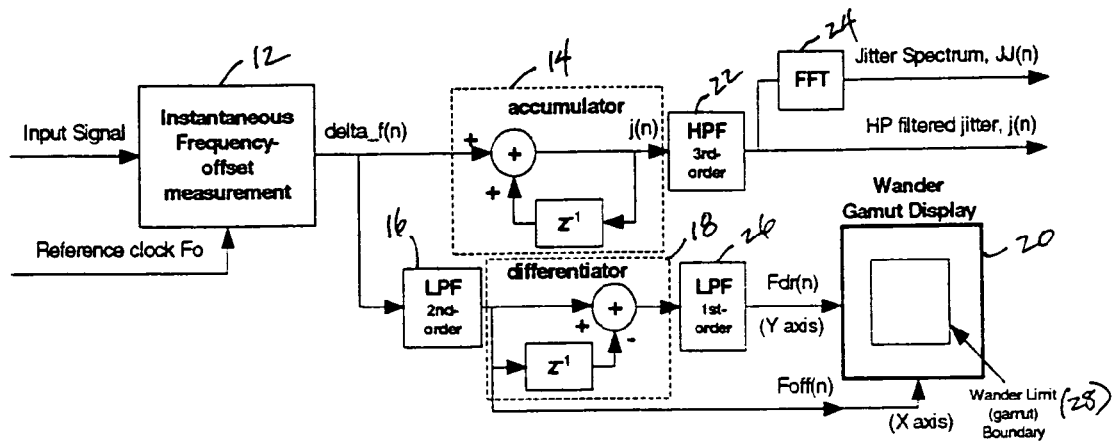
FIG. 7 is a logical block diagram view of a preferred method of creating a wander gamut display plot according to the present invention.
Figure 8:
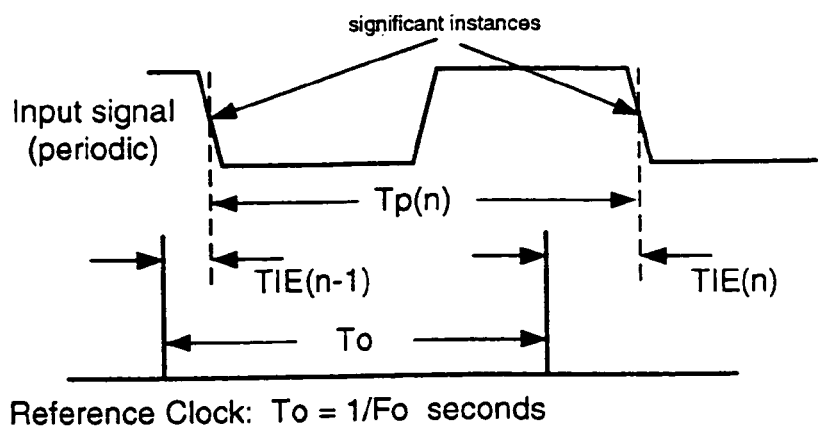
FIG. 8 is a waveform timing diagram view of a method of determining normalized, instantaneous frequency offset according to the present invention.

Referring now to FIG. 7 and the associated timing diagram of FIG. 8, the jitter/wander processing is shown as discrete-time samples of normalized instantaneous frequency offset. A periodic input signal and a reference clock Fo are input to an instantaneous frequency offset measurement module 12 to produce an instantaneous (normalized) frequency offset delta_f(n). Looking at the timing diagram of FIG. 8 consecutive significant instances, such as the mid-point or zero-crossing point of negative slopes of the input signal, provide a period time Tp(n) for each cycle of the input signal. The period from the first significant instance defining the period time of the current discrete-time sample and the next occurrence of the reference clock pulse is measured as TIE(n−1). Likewise the period from the next significant event to the next reference clock pulse is measured as TIE(n). The period To of the reference clock is presumed to be essentially constant, and is known. The instantaneous frequency offset delta_f(n) is then:

$$\text{delta\_}f(n)=[TIE(n-1)-TIE(n)]/To=[To-Tp(n)]/To$$

The instantaneous frequency offset delta_f(n) is then input to an accumulator 14 and a second order lowpass (LP2) filter 16, the output of which is input to a differentiator 18. The output from the LP2 filter 16 is the frequency offset Foff(n) which is applied to one axis of a wander gamut display 20. The output j(n) from the accumulator 14 is input to a third order high pass (HP3) filter 22 to produce a high pass filtered jitter output, as shown in FIG. 4, which in turn is input to a fast Fourier transform (FFT) module 24 to produce a jitter spectrum JJ(n), as shown in FIG. 5. The output from the differentiator 18 is input to a first order LP (LP1) filter 26 to provide a frequency drift rate signal Fdr(n) which is applied to the other axis of the wander gamut display 20. The wander gamut display 20 includes a central bounding box 28 which defines the wander limits in offset and drift rate. Values that fall outside the bounding box 28 indicate a wander error that may result in data errors.

Thus the present invention provides a wander gamut display for displaying transmitted data timing perturbation analysis information by determining frequency offset and frequency drift rate, which are then input to respective axes of a Cartesian display together with a wander limit boundary box that defines the wander gamut.

What is claimed is:

1. A method of displaying timing perturbation analysis information comprising the steps of:
   determining frequency offset and frequency drift rate values by low pass filtering an input signal below a demarcation frequency; and
   providing a Cartesian plot of frequency offset versus frequency drift rate, the Cartesian plot including limits for the frequency offset and frequency drift rate values that define a central bounding box.

2. The method as recited in claim 1 further comprising the step of highlighting values for the frequency offset/drift rate when the values are outside the central bounding box.

3. The method as recited in claim 1 further comprising the step of recursively updating the values in the Cartesian plot with a set integration time.

4. The method as recited in claim 1 further comprising the step of accumulating the values in the Cartesian plot until cleared to provide infinite persistence for program quality control testing.

5. A method of displaying frequency offset and frequency drift rate data produced by a wander measurement instrument comprising the steps of:
   calculating the frequency offset and frequency drift rate data by low pass filtering an input signal below a demarcation frequency; and
   displaying the frequency offset and frequency drift rate data on a Cartesian plot of frequency offset versus frequency drift rate, the Cartesian plot including limits for the frequency offset and frequency drift rate values that define a central bounding box.

6. A wander measurement instrument having a display according to the method of claim 1.

* * * * *